(12) United States Patent
Bauer et al.

(10) Patent No.: US 7,445,095 B2
(45) Date of Patent: Nov. 4, 2008

(54) BRAKE SYSTEM HAVING A COMPOSITE-MATERIAL BRAKE DISC

(75) Inventors: Moritz Bauer, Augsburg (DE); Udo Gruber, Neusäss (DE); Michael Heine, Allmannshofen (DE); Andreas Kienzle, Thierhaupten (DE); Rainer Zimmermann-Chopin, Ellgau (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 10/171,591

(22) Filed: Jun. 14, 2002

(65) Prior Publication Data
US 2003/0057040 A1 Mar. 27, 2003

(30) Foreign Application Priority Data
Jun. 30, 2001 (DE) ................. 101 31 769

(51) Int. Cl.
*F16D 65/10* (2006.01)
(52) U.S. Cl. .................. 188/281 XL; 188/251 M
(58) Field of Classification Search ........... 188/218 XL, 188/18 A, 251 A, 250 G, 251 M; 156/89.25; 264/682; 428/408, 698
See application file for complete search history.

(56) References Cited

U.S. PATENT DOCUMENTS

| | | | | | |
|---|---|---|---|---|---|
| 3,552,533 | A | * | 1/1971 | Nitz et al. | 192/107 M |
| 3,970,174 | A | * | 7/1976 | Kirkhart | 188/251 A |
| 5,007,508 | A | * | 4/1991 | Lacombe | 188/251 A |
| 5,230,946 | A | * | 7/1993 | Fisher | 428/212 |
| 5,261,511 | A | * | 11/1993 | Libsch et al. | 188/218 XL |
| 5,372,222 | A | * | 12/1994 | Rhee et al. | 188/218 XL |
| 5,576,358 | A | * | 11/1996 | Lem et al. | 523/153 |
| 5,686,144 | A | * | 11/1997 | Thebault et al. | 427/282 |
| 6,030,913 | A | | 2/2000 | Heine et al. | |
| 6,042,935 | A | * | 3/2000 | Krenkel et al. | 428/307.7 |
| 6,077,607 | A | | 6/2000 | Zornik | |
| 6,110,268 | A | | 8/2000 | Gross et al. | |
| 6,231,791 | B1 | | 5/2001 | Heine et al. | |
| 6,248,269 | B1 | | 6/2001 | Dietrich et al. | |
| 6,261,981 | B1 | | 7/2001 | Dietrich et al. | |
| 6,265,071 | B1 | | 7/2001 | Gross et al. | |
| 6,273,222 | B1 | * | 8/2001 | Rebstock et al. | 188/251 A |
| 6,358,565 | B1 | | 3/2002 | Krenkel et al. | |
| 6,439,353 | B2 | * | 8/2002 | Roloff et al. | 188/73.32 |
| 6,474,453 | B2 | * | 11/2002 | Sano | 188/251 A |
| 6,514,562 | B1 | * | 2/2003 | Clark et al. | 427/140 |
| 6,514,592 | B1 | * | 2/2003 | Hubbard et al. | 428/66.2 |
| 6,527,092 | B2 | * | 3/2003 | Gruber et al. | 188/218 XL |
| 6,531,011 | B2 | * | 3/2003 | Gross et al. | 156/89.25 |
| 6,666,310 | B1 | * | 12/2003 | Berreth et al. | 188/251 A |
| 6,709,736 | B2 | * | 3/2004 | Gruber et al. | 428/293.4 |

FOREIGN PATENT DOCUMENTS

| | | |
|---|---|---|
| DE | 44 38 456 A1 | 5/1996 |
| DE | 197 10 105 A1 | 9/1998 |
| DE | 197 11 829 C1 | 9/1998 |
| DE | 197 11 830 A1 | 10/1998 |
| DE | 197 27 585 A1 | 2/1999 |
| DE | 197 27 586 A1 | 2/1999 |
| DE | 198 34 018 C1 | 2/2000 |
| EP | 0 818 636 A1 | 1/1998 |
| EP | 0 887 572 A1 | 12/1998 |
| EP | 1 084 997 A2 | 3/2001 |
| WO | WO 00/41982 | * 7/2000 |

* cited by examiner

*Primary Examiner*—Bradley T King
(74) *Attorney, Agent, or Firm*—Laurence A. Greenberg; Werner H. Stemer; Ralph E. Locher

(57) ABSTRACT

A brake system includes a friction coupling having organically or inorganically bound metal-containing, sintered-metal-containing and/or CFC-containing brake linings and a brake disc of fiber-reinforced C/SiC ceramic composite material. A friction layer and/or a surface of the brake disc subject to friction has a proportion of SiC greater than 65% and material compositions in a core region and a surface region of the brake disc are different. The brake system may be used in motor vehicles, rail vehicles or aircraft.

6 Claims, No Drawings

BRAKE SYSTEM HAVING A COMPOSITE-MATERIAL BRAKE DISC

BACKGROUND OF THE INVENTION

Field of the Invention

The invention relates to a brake system including a friction coupling having organically or inorganically bound metal-containing, sintered-metal-containing and/or CFC-containing brake linings and a brake disc of fiber-reinforced C/SiC ceramic composite material.

Materials that are reinforced with carbon fibers and/or graphite fibers and have a matrix which is substantially formed of carbon are described as "CFC" or C/C or "CFRC" (Carbon Fiber Reinforced Carbon). "C/SiC" materials are reinforced with carbon fibers and/or graphite fibers and have a matrix which is predominantly formed of silicon carbide.

German Patent DE 197 11 829 C1, corresponding to U.S. Pat. No. 6,261,981 and German Published, Non-Prosecuted Patent Application DE 197 10 105 A1, corresponding to U.S. Pat. Nos. 6,030,913 and 6,231,791, disclose how composite materials suitable for brake discs can be produced from C/SiC reinforced with carbon-containing fibers and fiber bundles through the use of the so-called liquid-siliconization process. Those composite materials are produced by infiltrating porous carbon-fiber-reinforced and/or graphite-fiber-reinforced carbon composite bodies (C/C) with a silicon melt. In that process, a proportion of free carbon and carbon-containing fibers is converted to silicon carbide, as a result of which a dense ceramic matrix formed of SiC and Si is formed. The braking behavior and wear behavior of the braking system is substantially influenced by the matching of the material properties of the rubbing surfaces of the brake disc or of the friction surface or of the friction ring, on one hand, and of the brake lining, on the other hand.

German Published, Non-Prosecuted Patent Application DE 197 27 586 A1, corresponding to European Patent Application EP 0 887 572 A1 and to U.S. Pat. No. 6,248,269 B1, describes a combination of a C/SiC brake disc and a SiC brake lining in which the C/C precursor body for the brake disc has a lower density than near-surface regions of the C/C precursor body of the brake lining. However, the frictional and wear behavior is still not satisfactory, primarily due to the great hardness of both frictional partners.

German Published, Non-Prosecuted Patent Application DE 197 27 585 A1, corresponding to U.S. Pat. No. 6,265,071 B1, discloses a combination of a chopped-fiber-reinforced C/SiC ceramic brake disc and a brake lining formed of a sintered-metal material or an inorganically bound material having a ceramic binder phase and metal particles. In that case, the brake lining composition is matched to the given C/SiC material in such a way that the lining can be subjected to high temperatures. In regard to braking behavior and wear, in particular of the brake disc, that system is also still unsatisfactory.

It is known from German Published, Non-prosecuted Patent Application DE 44 38 456 A1, corresponding to U.S. Pat. No. 6,042,935, that within a C/C and/or C/SiC brake disc, different requirements are imposed on the mechanical strength and the frictional properties of the ceramic material. It is therefore proposed to divide the brake disc into a mechanically strong core body or support body and a frictional body, permanently joined thereto, having properties matched to the frictional properties.

European Patent Application EP 0 818 636 A1, corresponding to U.S. Pat. No. 6,077,607, discloses motor-vehicle brake discs composed of a C—C/C/SiC material that is given an SiC coating through the use of an immersion-bath impregnation or vacuum impregnation.

German Patent DE 198 34 018 C1, corresponding to U.S. Pat. No. 6,358,565 B1, teaches the production of wear-protection layers. The protection layers are not formed of pure SiC, but instead additionally contain free silicon, preferably in a proportion by weight in a range from 50% to 90%, relative to the weight of the protective layer. The protective layer is produced by the infiltration of porous carbon surface layers on ceramic composite materials, such as C/C, C/C—SiC, with silicon. Although the protective layers described effect a reduction in wear, abrasion and corrosion, a disadvantage of that composition of the protective layer is a poor frictional behavior (insufficient braking action).

A multilayer structure of a brake disc having a different material composition in a core region and a surface region is not known from that prior art. There are also no indications that a minimum content of SiC in the friction surface and a maximum content of silicon must be maintained to achieve a good braking action.

SUMMARY OF THE INVENTION

It is accordingly an object of the invention to provide braking systems having brake linings formed of metal-containing or sintered-metal-containing materials or CFC-containing materials and brake discs formed of C/SiC materials, which overcome the hereinafore-mentioned disadvantages of the heretofore-known devices of this general type and which have an improved friction layer both in regard to their frictional behavior and in regard to their service life.

With the foregoing and other objects in view there is provided, in accordance with the invention, a brake system, comprising a friction coupling. The friction coupling includes organically or inorganically bound metal-containing, sintered-metal-containing and/or CFC-containing brake linings. The friction coupling also includes a brake disc of fiber-reinforced C/SiC ceramic composite material having a support body and at least one friction layer with different material compositions. The friction layer has a proportion of SiC greater than 65%.

Different material compositions are identified as those with the same qualitative composition, but differing in the proportion by weight of at least one component by more than 0.01 (1% relative to the total mass of the material). In the case of a different qualitative composition, it is necessary for at least one component to be present in only one of the different compositions in a proportion by weight of at least 0.5% of the total weight of the material.

The friction disc or brake disc is made of C/SiC and has a friction layer and/or a surface layer on the friction surface that has an SiC content of more than 65% and an Si content of less than 25%. The remaining material is predominantly formed of carbon. Preferably, a composition having an SiC content of more than 70% and, particularly preferably, in a range from 80 to 99% is chosen. The content of free silicon is then preferably less than 20% and, particularly preferably, less than 9%. Unless expressly stated otherwise, all of the contents specified with the unit "%" are proportions by weight (in g/100 g or cg/g).

In order to produce the C/SiC brake disc, CFC moldings are first produced as green compacts in a known manner. The CFC can be fiber-reinforced both with continuous fibers and with chopped fibers in the form of woven fabrics, mats, felts or strands, in particular with chopped-fiber strands bound by a carbon matrix. In this connection, carbon-containing fibers, preferably coated carbon or graphite fibers and fibers composed of a material system Si/C/B/N are typically used. In general, fibers are used that have been coated with carbon-containing pyrolyzable organic pitches and resins or organometallic resins or through the gas phase. Organic pitches and resins, optionally containing additives composed of further metal compounds or metalloids compounds, can be applied by liquid impregnation or carbon can be deposited from the gas phase for the production of fiber strands as well as for the secondary compaction of carbon-containing green compacts and CFCs.

In the construction of the brake disc, the composition of the CFC blank is preferably chosen in such a way that a central layer of the disc, which will form the support body (core region), is given the necessary mechanical strength. A proportion by weight of at least 10% of the carbon-containing fibers is therefore preferred. The CFC layer that corresponds to the (later) friction layer which can be manufactured together with or separately from the support body must have a carbon content suitable for the desired later SiC content. In this connection, it is not absolutely necessary to use carbon as a fiber-shaped material for the friction layer. In this case, a C-fiber-free layer is produced from the carbon-containing layer of the friction zone.

After the disc-shaped molding has been produced from one or more green compacts of the support body and of the friction disc, the disc is siliconized by infiltration with a silicon melt at temperatures above 1420° C. In this process, at least some of the carbon is converted in a known manner into silicon carbide by chemical reaction. The compositions of the C/SiC are adjusted in the brake disc in such a way that the SiC content of the support zone is less than that in the friction layer. Typically, that content is less than 65% (or less than 70% if the friction layer is free of carbon-containing fibers) in the support zone and, particularly preferably, less than 60%. According to the invention, material variants having silicon phases in the matrix, that is to say the proportion of the matrix that does not contain SiC or carbon, and may also include further metals or metalloids in proportions by weight of up to 50%, relative to the weight of the "silicon phase" are, according to the invention, likewise included under the concept of the C/SiC material both of the support ring and of the friction disc. The term silicon phase is also collectively used below if the metals or metalloids of the matrix are dissolved in the Si, as Si alloys, as a dispersion in Si, as a discrete Si compound or a largely separate phase. Typically, these metals or metalloids are introduced into the composite material during the liquid siliconization as alloy constituents of the silicon and accumulate in the silicon phases of the material. The metals typically include Mo, Ni, Cr, Ti, Fe, Cu, Al and B. Since the friction layer is worn away as a result of wear and tear, the friction layer is to be understood herein as being the entire material layer that is situated opposite the friction lining or brake lining at least within the service life of a brake disc and interacts tribologically with the former. The thickness of the friction layer is therefore typically greater than 0.5 mm and, preferably, greater than 1 mm and, particularly preferably, greater than 2.5 mm prior to wear and tear.

The brake linings, which interact with the brake discs as a component of the braking system, can be produced by pressing and subsequent heat treatment or sintering. In these processes, mixtures are produced from metals, in particular particles or powders, and/or fibers and/or whiskers, carbon particles, in particular powders and/or fibers and, optionally, particles, in particular powders and/or fibers and/or whiskers of hard materials selected, in particular, from carbides, nitrides, borides and silicides of metals of subgroups 4 to 6 of the periodic system (Ti, Zr, Hf, V, Nb, Ta, Cr, Mo, W), boron carbide, cubic boron nitride, silicon carbide and aluminum oxide.

Iron and iron alloys, bronze, silicon, ferrosilicon and copper are preferred metals. Optionally, lubricants, such as graphite or molybdenum sulfide, may be added to the mixture. The mixtures are in some cases made homogeneous with the addition of organic binders that pyrolyze on heating, such as, for example, pitch or phenolic resins, and in some cases are pressed into the desired shape with the addition of inorganic binders. As a result of heating to temperatures of approximately 200° C., which is preferred for organic binders, and up to approximately 1400° C., which is preferred for inorganic binders, preferably with the exclusion of (atmospheric) oxygen, unpressurized sintering or sintering under pressure and cooling, the brake linings are available in their final composition and structure. In particular, the inorganic binders include organometallic polymers or ceramic precursors that are pyrolytically decomposed to form ceramic binders such as, for example, polysiloxanes, polysilanes and carbosilanes. Suitable linings are described, for example, in German Published, Non-prosecuted Patent Application DE 197 11 830 A1, corresponding to U.S. Pat. No. 6,110,268, the disclosure of which is incorporated herein by reference.

Friction couplings including the brake discs in accordance with the invention exhibit a substantially constant frictional behavior at high friction coefficients over large temperature and speed ranges. The low material removal of the friction layer and therefore the long service life of the disc is particularly advantageous.

The braking systems provided according to the invention can be advantageously applied in motor vehicles, rail vehicles and aircraft.

Other features which are considered as characteristic for the invention are set forth in the appended claims.

Although the invention is described herein as embodied in a brake system having a composite-material brake disc, it is nevertheless not intended to be limited to the details given, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples.

EXAMPLE 1

Carbon-fiber strands are first prepared, in order to produce a brake disc according to the invention. For this purpose, PAN-based carbon fibers are impregnated with phenolic resin and heated to 130° C. to produce prepregs. The prepregs are placed on top of one another, pressed to form fiber plates and fired at 900° C. Secondary compression is then carried out three times with coal-tar pitch and firing carried out at 900° C. and graphitization then being carried out at 2000° C. after the final secondary compaction. A CFC body which is thus obtained is comminuted and fractionated through the use of sieving. Fractions obtained therefrom serve as fiber strands for the production of a support body and a friction layer.

In order to provide the support body, a mixture is prepared in which 70% of the total mass includes fiber strands, 70% of which are in the <10.5 mm length distribution and 30% in the 10.5 to 20 mm length distribution. 20% of the total mass is phenolic resin and 10% of the total mass is coal tar pitch. The mixture is then pressed to form a mold corresponding to the support-body geometry and cured at a temperature of 130° C.

In order to provide the corresponding frictional layer, a mixture is prepared in which 70% of the total mass includes fiber bundles, 50% of which are in the <0.5 mm length distribution and 50% in the 0.5 to 1 mm length distribution. 30% of the total mass is phenolic resin. The mixture is granulated with further additives and solvent in a mixer and then pressed to form discs having a thickness of 5 mm and is cured at approximately 130° C.

The friction layer is bonded to the support body with a fiber-containing material and a brake-disc blank which is thus obtained is carbonized or pyrolyzed at 900° C. Silicon infiltration is then carried out in vacuum at 1700° C.

The SiC content which is thereby produced in the friction layer is greater than 68%. The coefficient of friction with respect to organically bound friction linings is in the range of $\mu=0.45$-$0.5$. In the case of inorganically bound linings, the coefficients of friction have a very constant range even at high temperatures.

EXAMPLE 2

A procedure for producing fiber-strand fractions and a support ring, is initially as described in Example 1. In order to further increase the SiC content of the friction layer, in contrast to Example 1, a friction-layer mixture is prepared in which 56% of the total weight includes fiber bundles, 50% of which are in the <0.5 mm length distribution and 50% in the 0.5 to 1 mm length distribution. 14% of the total weight is graphite powder and 30% of the total weight is phenolic resin. The procedure is then analogous to Example 1.

A SiC content which is thereby produced in the friction layer is greater than 70%. The coefficient of friction with respect to organically bound friction linings is in the range of $\mu=0.4$-$0.45$. In the case of inorganically bound linings, the friction coefficients have a very constant range even at high temperatures.

EXAMPLE 3

A procedure used to produce the fiber-bundle fractions and the support ring, is initially as described in Example 1. In order to further increase the SiC content of the friction layer, in contrast to Example 1, a friction-layer mixture is prepared in which 70% of the total weight includes fiber bundles having the length distribution <0.5 mm and 30% of the total weight is phenolic resin. The procedure is then analogous to Example 1.

The Si content that is thereby produced in the friction layer is greater than 90%. The coefficient of friction is in the range of $\mu=0.35$-$0.4$. In the case of organically bound linings, the coefficients of friction have a very constant range even at high temperatures.

We claim:

1. A brake system, comprising a friction coupling, including:
   organically or inorganically bound brake linings selected from at least one of the group consisting of metal-containing brake linings, sintered-metal-containing brake linings and CFC-containing brake linings; and
   a multilayer rotor brake disc of fiber-reinforced C/Sic ceramic composite material that includes reinforcing carbon fibers and a ceramic matrix formed of SiC and Si, said rotor brake disc including a central layer forming a support body and at least one friction layer having a surface subject to friction, both said support body and said friction layer being obtained by providing a CFC molding comprising carbon, wherein said CFC molding is reinforced with chopped fiber strands, said fibers having been coated with carbon-containing pyrolyzable organic pitches and resins subjected to firing and subsequent graphitization, and siliconizing said CFC molding by infiltrating with silicon melt, said silicon melt including further metals or metalloids as alloy constituents, said metals and metalloids being selected from the group consisting of Mo, Ni, Cr, Ti, Fe, Cu, Al, and B, and chemically reacting at least some of said carbon to form said SiC in said ceramic matrix;
   said support body and said at least one friction layer each having a different material composition, said at least one friction layer having a proportion of SiC of 70% to 99% and a proportion of Si of less than 20%, and said support body having a SiC content less than 65%, said at least one friction layer having a thickness greater than 0.5 mm, and wherein in said at least one friction layer a proportion by weight of 50% of said fibers have a length of less than 0.5 mm.

2. The brake system according to claim 1, wherein said friction layer has a proportion of said SiC of 80 to 99%, a Si content of less than 9%, and remaining material predominantly composed of carbon.

3. The brake system according to claim 1, wherein said fiber-reinforced C/Sic ceramic composite material has silicon phases, and said silicon phases of said C/Sic composite material are present in at least one of said support body and said at least one friction layer and contain up to 50% of said metals or metalloids.

4. An automobile brake system, comprising a brake system according to claim 1.

5. A rail vehicle brake system, comprising a brake system according to claim 1.

6. An aircraft brake system, comprising a brake system according to claim 1.

* * * * *